United States Patent [19]

Patterson

[11] Patent Number: 5,391,220

[45] Date of Patent: Feb. 21, 1995

[54] POLLUTION CONTROL SYSTEM AND METHOD OF USING SAME

[75] Inventor: Ronald G. Patterson, San Diego, Calif.

[73] Assignee: Calvert Environmental, Inc., San Diego, Calif.

[21] Appl. No.: 181,623

[22] Filed: Jan. 3, 1994

[51] Int. Cl.6 ............................................. B01D 50/00
[52] U.S. Cl. ........................................... 95/69; 95/187; 96/57; 96/60; 55/223; 55/462
[58] Field of Search .................. 96/57, 60; 95/69, 187; 55/223, 462

[56] References Cited

U.S. PATENT DOCUMENTS

| | | | |
|---|---|---|---|
| 2,055,048 | 9/1936 | Puls | 55/462 |
| 3,299,620 | 1/1967 | Hollingworth | 96/57 |
| 3,570,221 | 3/1971 | Oliver | 55/462 |
| 3,895,926 | 7/1975 | Lerner | 55/462 |
| 5,041,146 | 8/1991 | Wilhelm | 96/57 |

FOREIGN PATENT DOCUMENTS 660518 4/1963 Canada ..................................... 96/60

*Primary Examiner*—Tim Miles
*Attorney, Agent, or Firm*—William Patrick Waters

[57] ABSTRACT

A pollution control system and method in which hot flue gas is cooled to saturation in a quencher and passed through a condenser absorber assembly to further cool the saturated gases while growing small particles as the particles act as nuclei for the condensation of water vapor thereon. The grown particles are carried through an aperture having a low pressure drop throat so that high efficiency particle collection is accomplished. At its outlet, the aperture produces a concentration of the gases and water droplets. A dome shaped gas reverser, having its concave surface directed upstream, is located spaced apart from the aperture and in substantial alignment with the outlet of the aperture. The gas reverser receives the gas stream as it exits the aperture, mixing and diffusing the gas and its constituents as they change direction to spill out over the lip of the gas reverser.

15 Claims, 1 Drawing Sheet

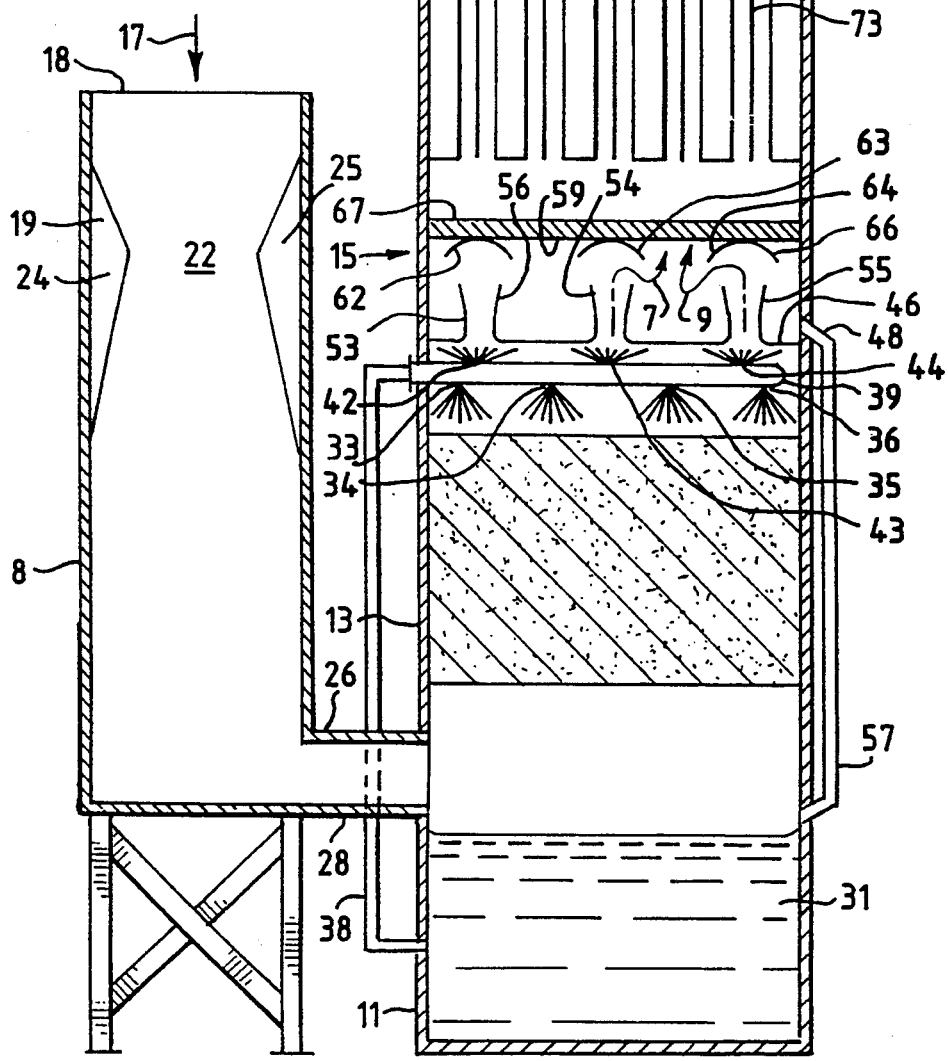

POLLUTION CONTROL SYSTEM AND METHOD OF USING SAME

TECHNICAL FIELD

The present invention relates in general to pollution control systems and methods of using them for removing unwanted constituents from a fluid. More particularly, the present invention relates to a pollution control system and method which are adapted to operate in a more effective and efficient manner in removing unwanted substances from incinerator flue gases.

BACKGROUND ART

It is well recognized in modern society that hazardous waste management has become an important consideration. In response to widespread public concern, substantial amounts of money are expended for waste treatment systems so that the varied, complex and hazardous products of human activity can be effectively removed from the environment. It is preferred, of course, that these products be foreclosed from entering the environment in the first place.

Thus, it is generally acknowledged that preventing the introduction of hazardous materials into the environment has significant value. In this regard, air pollution control systems have been shown to be useful in removing unwanted airborne substances from a waste gas stream prior to its release into the atmosphere. As a rule, effective pollution control systems eliminate, or at least substantially reduce, undesirable airborne substances at or near the point of their generation. In this manner, by addressing the problem near its source, contaminants may be effectively removed when they are at their greatest concentration.

Historically, particulate contaminants issuing from smoke stacks received early attention and, for some time, flue gas scrubbers have been utilized in an attempt to reduce particulates in the waste gases from furnaces and incinerators. In the case of larger flue particulate contaminants, wet scrubbers have been utilized for treating the gas and removing the particulates.

In a typical wet scrubber, particle removal is achieved when water under pressure is sprayed into a treatment chamber through which the flue gas flows. In large measure, the removal function is mechanical rather than chemical. Large orifice nozzles, producing large droplets, are suitable because large aqueous surface areas are not required for mediating chemical reactions. Examples of conventional gas scrubbers are seen in U.S. Pat. Nos. 3,894,853 and 5,147,421.

While conventional scrubbers are useful in some applications, they are often not suitable for the more challenging removal problems presented by emissions from sources of hot gas streams. In some cases, these gas streams are produced by incinerators operating at very high temperatures for the incineration of hazardous wastes from hospitals, municipal sewage sludge and other sources. The hot flue gas contains a variety of hazardous constituents, including heavy metals, acid gases, ash and known or suspected carcinogenic substances. Conventional scrubbers alone are generally ineffective in removing these substances.

In general, the flue gas streams from incinerators carry relatively large particles having diameters in the 3–4 micron range down to smaller particles having a diameter of about 0.3 microns or less.

In cases where it has been necessary to remove particles having a diameter of less than 1 micron, Venturi scrubbers have had some value. These scrubbers are often gas atomizing devices which rely on shearing and impaction forces to break water into fine droplets to attain an even distribution of droplets at high density. As a result, there exists a probability that a contaminant particle, on impacting a droplet, will become enlarged and ultimately inertially separated. In these systems, large volumes of water and unacceptably high energy inputs are sometimes required for effective flue gas treatment. Thus, Venturi scrubbers alone are not generally suitable for removal of unwanted substances from incinerator flue gases.

Concomitant with the development of Venturi scrubbers has been development of electrostatic precipitators which, in some applications, are effective in the removal of airborne particulates. Examples of electrostatic precipitators are seen in U.S. Pat. Nos. 1,329,825; 1,479,270; 2,730,195; 3,765,154; 3,958,961 and 4,251,234.

Generally, in a high energy Venturi, the practical limits of inertial based removal techniques are not suitable for removal of submicron particles since such particles behave as if they have little or no mass. When these particulates are to be removed, conventional systems have sometimes employed the principle of electrostatic attraction so that a conventional scrubber could have its removal efficiency enhanced by the application of a positive charge to the incoming gas stream. Because water tends to be electronegative, small particulates can be attracted to the water by electrostatic forces and subsequently washed out of the system as sludge. Thus, for some applications, combinations of scrubbers and electrostatic precipitators are useful. Such combinations are disclosed in U.S. Pat. Nos. 4,019,444; 4,256,468; 4,305,909; 4,957,512 and 5,154,734.

The Venturi scrubber/electrostatic precipitator combination, while suitable in certain instances, has limited utility in incinerator flue gas treatment. Generally in such applications, these systems are expensive, requiring high energy consumption and consuming unacceptably large amounts of water and reagents. Further, the systems are often very large, requiring substantial amounts of space. Because of their size, installation, plumbing and maintenance costs are significantly increased.

In addition to the above mentioned limitations of conventional air pollution control systems, a short gas dwell time in the system sometimes presents a problem since too rapid a gas flow through a precipitator results in unacceptable system performance. The attempt to increase dwell time in conventional systems has sometimes required increasing the size of pollution control systems employing electrostatic precipitators. As a result, pollution control systems tend to become very large in the attempt to accommodate the high gas flow rates produced by modern incinerators. In spite of their size, however, many conventional systems are still unable to remove incinerator gas particulates at an acceptable level of performance and at an economical cost of operation.

The problem presented when the gas stream passes too rapidly through the electrostatic precipitator was recognized early in the development of gas treating systems and some attempts have been made to remedy the condition. In this regard, reference may be made to U.S. Pat. Nos. 1,329,825 and 1,479,270 in which an obstruction plate is located upstream of the precipitator.

In U.S. Pat. Nos. 2,730,195 and 3,958,961, upstream baffles are utilized. While such obstructions serve to delay gas flow through the precipitator, they also can cause turbulence in the gas stream thereby sometimes diminishing precipitator performance. Further, they add to the expense of system operation because of the additional energy required to drive the gas through the system. Thus, the use of obstructing baffles and plates has limited value in improving system performance.

Another problem encountered in the use of wet electrostatic precipitators is that, in some cases, the fluids entering the precipitator contain unmixed streams of gas and water. This maldistribution results in diminished precipitator performance and, as a consequence, the release into the environment of undesirable substances. In addition, such maldistribution can contribute to corrosion within the precipitator, thereby shortening the useful life of the system.

In view of the foregoing, it would be highly desirable to have a pollution control system which would be efficient and economical in operation, effective in removing a broad spectrum of unwanted incinerator flue gas substances. Such a system would optimize precipitator performance while reducing deterioration of the precipitator. In addition, the system would be relatively maintenance free and would be substantially more compact than conventional systems.

DISCLOSURE OF INVENTION

It is an object of the present invention to provide a pollution control system and method for removing a broad spectrum of unwanted contaminants from incinerator flue gases while conserving energy and water.

It is another object of the present invention to provide a new and improved pollution control system and method which are capable of waste gas treatment in a cost effective, relatively maintenance free manner.

It is a further object of the present invention to provide a new and improved pollution control system in which most of the system components are located in a single vessel.

It is a still further object of the present invention to provide a new and improved pollution control system in a compact arrangement of components to conserve the plant area required for its installation.

It is still another object of the present invention to provide an improved pollution control system and method for removing hazardous constituents from waste gas streams while substantially reducing the amounts of water vapor being released into the atmosphere.

Briefly, the above and further objects of the present invention are realized by providing a pollution control system and method in which hot flue gas is cooled to saturation in a quencher and passed through a condenser absorber assembly to further cool the saturated gases while growing smaller particles as the particles act as nuclei for the condensation of water vapor thereon. The grown particles are carried through an aperture having a low pressure drop throat so that high efficiency particle collection is accomplished. At its outlet, the aperture produces a concentration of the gases and water droplets. A dome shaped gas reverser, having its concave surface directed upstream, is located spaced apart from the aperture and in substantial alignment with the outlet of the aperture. The gas reverser receives the gas stream as it exits the aperture, mixing and diffusing the gas and its constituents as they change direction to spill out over the lip of the gas reverser dome.

During system operation, hot flue gases flow through the system at very high flow rates and, as the gas stream passes through the condenser absorber assembly, particles smaller than about 0.3 microns are grown to approximately twice their size as the particles act as nuclei for condensation for water vapor. The gas, containing the enlarged nuclei, then passes through the aperture throat where high particle collection at low pressure drop occurs. From there, the gas impinges on the gas stream reverser which smoothly reverses the flow of the stream, thereby mixing the gas stream constituents prior to their entry into a wet electrostatic precipitator. As a result of the mixing of the gas and water by the gas reverser, the problem of maldistribution in the gas stream is substantially resolved, the load on the precipitator is reduced, and improved performance results.

In addition to its mixing function, the gas reverser acts as an entrainment separator and diffuser so that the gas is precleaned prior to passing into the electrostatic precipitator where particulate and remaining fine water droplets are charged electrostatically and precipitated onto the walls of collecting tubes, Further, the reverser reduces gas stream velocity thereby increasing dwell time in the precipitator.

After treatment in the precipitator, the cleaned gas flows through a plenum having a mist eliminator, thence into a stack by way of discharge ducting and fan. Collected liquids and solids drain from collecting tubes into a sump at the bottom of the system from whence they can be removed conveniently through a discharge drain, in a conventional manner.

The present invention provides several distinct advantages. First, it utilizes water vapor condensation effects to provide significantly enhanced particle collection. In this regard, some of the water vapor condenses on particles thereby causing their mass and diameter to increase and making them easier to collect while some of the condensing vapor sweeps particles with it as it moves toward cold surfaces. In addition, the gas reverser contributes substantially to the cleaning process by not only facilitating particle and acid gas removal but by conditioning the gas stream for more efficient distribution in the precipitator.

Another significant advantage of the present invention is that the stack gases contain about only one fifth of the water vapor of a conventional pollution control system thereby suppressing the undesirable "steam plume" often seen in pollution control systems. In addition, because of the reduced water content in the cleaned gas, rust formation in fans and other upstream apparatus is substantially reduced.

As a result of the aforementioned advantages and features of the present invention, effective flue gas cleaning can be accomplished in a smaller system. In this regard, the major components of the system are packaged in one vessel, thereby simplifying operation, providing a relatively maintenance free operation and affording substantial economical benefits.

BRIEF DESCRIPTION OF DRAWINGS

The above mentioned and other objects and features of this invention and the manner of attaining them will become apparent, and the invention itself will be best understood by reference to the following description of the embodiment of the invention in conjunction with the accompanying drawings, wherein:

FIG. 1 is a diagrammatic view of a pollution control system which is constructed according to the present invention;

FIG. 2 is a fragmentary diagrammatic view of another gas reverser which is constructed according to the present invention; and FIG. 3 is a fragmentary diagrammatic view of yet another gas reverser which is constructed according to the present invention.

BEST MODE FOR CARRYING OUT THE INVENTION

Referring now to the drawings and more particularly to FIG. 1 thereof, there is shown a new pollution control system 10 which is constructed in accordance with the present invention. The system 10 receives hot flue gases from hazardous waste incinerators. The flue gas stream may carry heavy metals, ash, acidic gases and other substances known or suspected to be hazardous to human health.

The system 10 is comprised generally of an elongated chamber 11 containing a condenser absorber assembly 13, a gas diffusing and stream reversing zone 15 and a wet electrostatic precipitator 23. After it has flowed through the system 10, the gas, substantially cleaned of unwanted substances, is exhausted to atmosphere in a conventional manner. In this regard, the gas delivered to the system discharge fan (not shown) for release to atmosphere contains less than one fifth the water vapor of conventional pollution control systems.

In operation, the waste gas enters the system 10, flowing in the direction shown by an arrow 17, through an inlet 18 into a quencher 8 in which is located a Venturi 19. The Venturi 19 has a throat portion 22 formed by wedges 24 and 25. As the gas stream flows through the venturi 19, atomizing nozzles (not shown) saturate the gas with a water mist, in a conventional manner. As the gas passes through the quencher 8, it is cooled to saturation and large particles are scrubbed out. Upon reaching an outlet 26 the gas flows through a conduit 28 into the chamber 11.

Most of the major components of the system 10 are disposed within the chamber 11. These comprise a sump 31, the condenser absorber assembly 13, atomizing nozzles, such as nozzle 33 and nozzle 42, the gas diffusing and reversing zone 15 and a wet electrostatic precipitator 23. In the tower 11, acid gases are removed while the gas volume is reduced and the gas is further cooled. At this stage, volatile heavy metals condensed from the vapor phase to a particulate phase. These condensed heavy metals and other submicron particles are grown to an enlarged condition for more convenient removal.

Water in sump 31 is pumped via a conduit 38 through a heat exchanger (not shown) to cool it. From there, the cooled water flows into a manifold 39 where it is mixed with an aqueous caustic solution delivered, in a conventional manner, from a liquid reservoir (not shown) to countercurrent atomizing nozzles 33, 34, 35 and 36 and cocurrent atomizing nozzles 42, 43 and 44. Each of the countercurrent and cocurrent nozzles spray the solution continuously during system 10 operation.

After entering the chamber 11, the gas flows in an upwardly direction through the condenser absorber assembly 13. The assembly 13 is packed with wet-film, cross fluted structural or random dumped packing material which provides extensive wet surfaces over which the gas stream flows.

Recirculated cooling water delivered by the atomizing nozzles, such as the countercurrent nozzle 33 and the cocurrent nozzle 43, wet the assembly 13, cool the air stream, condense water vapor, neutralize acid gas and grow submicron particles for removal by inertial impaction. In this regard, it should be recognized that while inertial impaction is effective for large particles, it is generally not effective for particles smaller than about 0.3 microns. As the gas stream flows through the condenser absorber assembly 13, the smaller particles grow to about 0.6 to 0.7 microns in diameter as they act as nuclei for condensation of water vapor. This puts the grown particles into a condition for effective downstream removal.

After flowing through the assembly 13, the gas encounters a plate 46 extending from which is a plurality of apertures, such as the apertures 53, 54 and 55 where particle collection occurs. Each aperture, such as the aperture 53, has a throat portion, such as the throat 56, which is designed for high efficiency particle collection at low pressure drop. In practice, a throat pressure drop of approximately 10 to 20 in. WC is suitable for reducing the load on the precipitator 23, and for improving its performance.

After the gas stream exits the apertures 52, 53 and 54, it flows through the gas diffusing and reversing zone 15. While flowing through the zone, the gas stream impinges on downwardly concave, dome shaped gas reversers, such as the gas reversers 62, 63 and 64. Each gas reverser is positioned in substantial alignment with the outlet of a corresponding aperture. Thus, for example, the reverser 62 is aligned with the aperture 53 and with the throat 56. Each gas reverser acts as separator and diffuser to reverse smoothly the direction of gas flow and to allow the gas to spill out around the edges such as the edge 66 of the gas reverser 64. It will be recognized that each portion of the gas stream entering a reverser will, in general, follow the course depicted by arrows 7 and 9. Thus, prior to flowing over the edge of a reverser, the gas undergoes a substantial amount of mixing as a result of the encounter with the gas reversers. In this manner, the gas reversers 62, 63 and 64 cause several important events to happen.

In the first place, more uniformity in the gas stream is achieved as the stream moves smoothly along the concave surfaces of the reversers. This results in a more effective mixing of the gas stream constituents while, at the same time, growth of particle nuclei is encouraged. Further, greater diffusion within the gas stream occurs and, because of the improved mixture of gas stream constituents, the stream is conditioned for more effective treatment in the downstream electrostatic precipitator 23. These factors result in substantially improved particle collection while the electrostatic precipitator remains cleaner and more corrosion resistant than is generally experienced in conventional pollution control systems.

In addition to their function in smoothly mixing the gas stream constituents, the gas reversers 62, 63 and 64 act to reduce the load on the precipitator 23 by reducing the velocity of the gas stream flowing therethrough to increase dwell time. In addition, by eliminating the problems related to maldistribution in the stream of gas and water, improved precipitator performance is realized.

Generally, the system 10 utilizes one aperture and its corresponding gas reverser per 2000 to 6000 cfm flowing through the system. In some applications, flow rates of 50,000 cfm may be seen. In such cases, twelve or more apertures and gas reversers, arrayed within the chamber 11 in coaxial relationship thereto, are utilized.

Downstream of the gas reversers 62, 63 and 64 is a mesh pad 67 which acts to reduce water drop carryover into the precipitator 23. The mesh pad 67 is supported by a grate 59 which also serves to hold the gas reversers 42, 43 and 44. The mesh is constructed of woven metal, polypropylene or other suitable materials. One or more drains, such as the drain 48, carry off water and collected particles through a conduit 57 to the sump 31 for eventual removal, in conventional fashion, from the system 10.

After the gas exits the zone 15 and flows through the mesh pad 67, it enters the precipitator 23. The precipitator is comprised of an upflow design having cylindrical collecting electrode tubes such as the tube 71 and a concentric rod electrode such as the electrode 73. The electrodes are suspended from a bus bar 77 contained in a housing 78 through which dry air is circulated, in a conventional fashion, for maintaining high voltage insulators, such as the insulator 83, in a dry condition. As the gas flows through the precipitator 23, particulate and remaining fine water droplets are electrostatically charged and precipitated onto the wails of the collecting tubes, such as the tube 71, for removal from the system 10 in a conventional manner.

Upon exiting the precipitator 23, the cleaned gas flows through another mesh pad 76 which is similar in construction and function to the mesh pad 67. It then flows through a plenum 75 and out of the system 10 at an outlet 79, in the direction shown by an arrow 81. Thence, the gas flows into a system discharge conduit (not shown) and fan (not shown) for discharge to atmosphere. At this point, the cleaned gas, while saturated, contains virtually no entrained water droplets.

Collected liquids and particles, from the collecting tubes, such as the tube 71, are washed into the sump 31 at the bottom of the chamber 11 from whence they are removed in a conventional manner.

Referring now to FIGS. 2 and 3, there are depicted, respectively, gas reversers 62a and 62b, each of which, while functioning in a similar manner, differs in shape from the dome shaped reversers of FIG. 1. In FIG. 2, there is shown an aperture 53a which is similar in structure and function to the aperture 53 of FIG. 1. The reverser 62a is aligned with the aperture and is downwardly directed, having a multifacted dome shape. It will be recognized that the reverser 62a permits gas flow to follow the course shown by an arrow 7a. Similarly, the reverser 62b of FIG. 3 is aligned with the aperture 53b. This reverser has a downwardly directed, generally conical shape for permitting gas flow as shown by arrow 7c.

It will be recognized that other gas reverser configurations, such as saucer or cup shape, for example, are within the scope of the present invention. Thus, while particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. A method of removing unwanted particles from hot flue gases emitted by an incinerator or similar source of such gases, comprising the steps of:
    (a) cooling the emitted hot flue gases to saturation in a quencher;
    (b) passing the saturated gases through a condenser to further cool the saturated gases while growing the size of at least smaller ones of the particles whereby the at least smaller ones act as nuclei for the condensation of water vapor onto the at least smaller ones of the particles to form, at the outlet of said condenser, particles suspended in water droplets;
    (c) passing the gases and water droplets, and thus the particles, through at least one aperture to effect, at an outlet of the aperture, a concentration of the gases and water droplets;
    (d) providing a gas reverser in substantial alignment with the outlet of the aperture whereby the gases impinge on and the water droplets impact said gas reverser functioning as an entrainment separator and diffuser whereby the impacting water droplets are broken into fine particulates and fine water droplets admixed with the gases; and
    (e) precipitating the fine particulates and fine water droplets to clean the gases by removing the unwanted particles therefrom while exhausting the cleaned gases to atmosphere.

2. The method according to claim 1, wherein the step of passing the gases and water droplets through the at least one aperture further includes the step of passing the gases and water droplets, and thus the particles, through a throat formed at the outlet of said at least one aperture.

3. The method according to claim 2 further including the step of dropping the pressure of the gases and water droplets at the outlet of said at least one aperture while passing the gases and water droplets through said throat.

4. Apparatus for removing unwanted particles from hot flue gases emitted by an incinerator or similar source of such gases, comprising:
    (a) a vessel having an upstream end with an opening therein for receiving gases and particles emitted by said incinerator and having an opening in a downstream end thereof for the exhaustion to atmosphere of clean gases passing through said vessel;
    (b) a condenser mounted in said vessel, adjacent the opening in the upstream end thereof, said condenser passing the gases downstream thereof while cooling the gases and growing the size of at least smaller ones of the particles whereby the at least smaller ones act as nuclei for the condensation of water vapor onto the at least smaller ones of the particles to form, at a downstream end outlet of said condenser, particles suspended in water droplets;
    (c) means, having at least one aperture formed therein, mounted in said vessel, downstream of said condenser, said at least one aperture passing said gases and water droplets, and thus the particles, to effect, at a downstream outlet of said at least one aperture, a concentration of gasses and water droplets;
    (d) a gas reverser mounted, in said vessel, downstream of said at least one aperture and in substantial alignment with the outlet of the aperture whereby the gases impinge on and the water droplets impact said gas reverser, said gas reverser functioning as an entrainment separator and diffuser whereby the impacting water droplets are broken into fine particulates and fine water droplets and admixed with the gases prior to flowing further downstream of said vessel; and (e) precipitator means mounted, in said vessel, downstream of said gas reverser, for precipitating the fine particulates and fine water droplets to thus clean the gases by removing the particles therefrom prior to exhausting the clean gas to atmosphere through the downstream opening of said vessel.

5. The apparatus according to claim 4, wherein said means having at least one aperture formed therein, further includes throat means, at the outlet of the aperture of said means having at least one aperture formed therein, for increasing the efficiency of particle collection prior to the water droplets impacting said gas reverser.

6. The apparatus according to claim 5, wherein said gas reverser includes a dome shaped member having a concave side pointing toward and in substantial alignment with said throat means.

7. The apparatus according to claim 6 further including means, mounted downstream of said reverser, for reducing carryover of water droplets into said precipitator means.

8. The apparatus according to claim 7, wherein said means for reducing carryover of water droplets is of mesh construction.

9. The apparatus of claim 8, wherein said means for reducing carryover of water droplets is supported by a grate and said grate holds said dome shaped member.

10. In an incinerator gas cleaning system, the combination comprising:

(a) a quencher, having an inlet and an outlet, for cooling hot flue gases, emitted by an incinerator, to saturation, the flue gas containing acid gases and unwanted particles;

(b) a vessel having an upstream end with an opening therein for receiving the saturated gases from the outlet of said quencher and having an opening in a downstream end thereof for the exhaustion to atmosphere of clean gases passing through said vessel;

(c) a condenser absorber mounted, in said vessel, downstream of the opening in the upstream end of said vessel, said condenser absorber further cooling the saturated gases to remove at least a majority portion of the acid gases and a portion of the particles while further growing the size of at least the smaller particles whereby the smaller particles act as nuclei for the condensation of water vapor onto the at least smaller particles to form larger particles in the form of water droplets, said condenser absorber passing the remaining acid gases and water droplets downstream thereof;

(d) means, having a plurality of apertures formed therein, and being mounted, in said vessel, downstream of said condenser absorber for providing a concentrated stream of the remaining acid gases and water droplets, and thus the particles, downstream of each aperture;

(e) gas reverser means mounted, in said vessel, downstream of said means having a plurality of apertures, the remaining acid gases and water droplets impinging on and impacting said gas reverser means whereby said gas reverser means functions as an entrainment separator and diffuser to remove the remaining acid gasses to provide acid free gas and break the impacting water droplets into fine particulates and fine water droplets which are admixed with the gases from the apertures prior to flowing further downstream of said vessel as acid free gas; and (f) precipitator means mounted, in said vessel, downstream of said gas reverser means, for precipitating the fine particulates and fine water droplets to thus remove, from the acid free gas, the remaining particles prior to exhausting the clean gas to atmosphere through the downstream opening of said vessel.

11. The incinerator gas cleaning system according to claim 10, wherein said means having a plurality of apertures formed therein further includes throat means, mounted downstream and in substantial alignment with each of said apertures, for increasing the efficiency of particle collection prior to the water droplets impacting said gas reverser means.

12. The incinerator gas cleaning system according to claim 11, wherein said gas reverser means includes a plurality of dome shaped members equal in number to the number of said throat means, each member having a concave side pointing toward and in substantial alignment with a corresponding one of said throat means.

13. The incinerator gas cleaning system according to claim 12 further including means, mounted downstream of said gas reverser means, for reducing carryover of water droplets into said precipitator means.

14. The incinerator gas cleaning means according to claim 13, wherein said means for reducing carryover of water droplets is of mesh construction.

15. The incinerator gas cleaning system according to claim 14, wherein said means for carryover of water droplets is supported by a grate and said grate holds said plurality of dome shaped members.

* * * * *